United States Patent [19]
Zaretskiy et al.

[11] Patent Number: 6,139,619
[45] Date of Patent: *Oct. 31, 2000

[54] BINDERS FOR CORES AND MOLDS

[75] Inventors: Leonid Zaretskiy, Chicago; Robert L. Manning, Oak Park; Kwok-tuen Tse, Berwyn, all of Ill.

[73] Assignee: Borden Chemical, Inc., Columbus, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/609,111

[22] Filed: Feb. 29, 1996

[51] Int. Cl.[7] ................................ B22C 1/18; B22C 9/02
[52] U.S. Cl. ..................... 106/629; 106/38.3; 106/38.9; 164/522; 164/528
[58] Field of Search .................... 164/528, 522; 106/38.3, 38.9, 629

[56] References Cited

U.S. PATENT DOCUMENTS

| | | |
|---|---|---|
| 2,541,674 | 2/1951 | Snyder . |
| 2,895,838 | 7/1959 | Ilenda . |
| 2,964,415 | 12/1960 | Payne, Jr. et al. ............... 106/629 X |
| 4,226,277 | 10/1980 | Matalon . |
| 4,331,197 | 5/1982 | Cole . |
| 4,416,694 | 11/1983 | Stevenson et al. . |
| 4,423,764 | 1/1984 | Seeney et al. . |
| 4,504,314 | 3/1985 | Barker et al. . |
| 4,983,218 | 1/1991 | Mascioli . |
| 5,000,933 | 3/1991 | Novotny et al. . |
| 5,160,639 | 11/1992 | McCollum . |
| 5,215,732 | 6/1993 | Hachgenei et al. . |

FOREIGN PATENT DOCUMENTS

| | | | |
|---|---|---|---|
| 2096863 | 3/1972 | France . | |
| 2029701 | 12/1971 | Germany ............... | 106/629 |
| 2856267 | 7/1980 | Germany . | |
| 246488 | 6/1987 | Germany ............... | 164/528 |
| 52-20927 | 2/1977 | Japan ..................... | 164/528 |
| 55-19463 | 2/1980 | Japan ..................... | 164/522 |
| 1107948 | 8/1984 | U.S.S.R. .................. | 164/528 |
| 1335366 | 9/1987 | U.S.S.R. .................. | 164/528 |
| 1338959 | 9/1987 | U.S.S.R. .................. | 164/528 |
| 530498 | 12/1987 | U.S.S.R. .................. | 164/528 |
| 1366277 | 1/1988 | U.S.S.R. . | |
| 1678497 | 9/1991 | U.S.S.R. . | |
| 1704900 | 1/1992 | U.S.S.R. . | |
| 1283301 | 7/1972 | United Kingdom . | |
| WO80/01254 | 6/1980 | WIPO . | |
| WO92/06808 | 4/1992 | WIPO . | |
| WO94/14555 | 7/1994 | WIPO . | |
| WO95/15230 | 6/1995 | WIPO . | |

OTHER PUBLICATIONS

Translation of German Patent Publication 2029701 Published Dec. 23, 1971.

Y.A. Owusu and A. B. Draper; "Inorganic Additives Improve The Humidity Resistance And Shakeout Properties of Sodium Silicate Bonded Sand"; *AFS Transactions*; pp. 47–54 (1980).

Abstract of U.S.S.R. Inventor's Certificate 801365 Published May 23, 1992.

Abstract of U.S.S.R. Inventor's Certificate 1678497 Published Sep. 23, 1991.

Abstract of U.S.S.R. Inventor's Certificate 1724415 Published Apr. 7, 1992.

Kirk–Othmer Chemical Encyclopedia; James S. Falcone, Jr.; 1980, pp. 867 and 868.

Sand Cores and Coremaking; Metals Handbook, 8th Edition, vol. 5, pp. 209–221, 1970.

*Primary Examiner*—J. Reed Batten, Jr.
*Attorney, Agent, or Firm*—Stevens, Davis, Miller & Mosher, LLP

[57] ABSTRACT

An inorganic binder system for foundry compositions includes a silicate and added phosphate. The composition produces a binder having the advantageous strength properties of a silicate binder system with the dispersibility properties of a phosphate binder system. Methods of making and using the binder systems and the resulting products are of particular interest to the foundry art.

20 Claims, No Drawings

BINDERS FOR CORES AND MOLDS

FIELD OF THE INVENTION

The present application relates generally to heat-cured inorganic binder systems for particulate material having particular utility in the manufacture of molds, cores, mandrels, or other shapes which can be used in the production of metal and non-metal parts.

BACKGROUND OF THE INVENTION

Organic and inorganic systems are currently used as binders in forming shapes from a mixture containing an aggregate material, such as sand. Typically, the aggregate material and binder are mixed, the resultant mixture is rammed, blown or charged to a pattern to form a desired shape and then cured with the use of a catalyst, co-reactant and/or heat to a solid cured state.

These binders find use in many applications for binding particulate material and are frequently used in foundry applications.

The most acceptable binder systems used in the foundry art are organic binder systems. A particular organic system used as a binder in the foundry arts is a urethane binder. The two major components of this system are a polyhydroxy component and a polyisocyanate component. These two components are added to an aggregate and cured. In the "cold box" process, a gaseous amine catalyst is used to catalyze the reaction between the polyhydroxy component and the isocyanate component to form a shape. This system requires no heating in order to achieve curing. (See for example U.S. patent application Ser. No. 08/285,108 filed Aug. 3, 1994 and now U.S. Pat. No. 5,852,071 herein incorporated by reference). In another process, the "hot box" process, aggregate, binder and catalyst are mixed and then blown or charged into a hot pattern. Curing is accomplished by the transfer of heat from the pattern to the aggregate mix. Regardless of the type of organic binder system, the organic binder used to produce desired shapes will volatilize during curing and/or burn out at metal pouring temperatures. Such processes produce smoke, odors and additional unwanted and harmful emissions which can result in the need to comply with applicable local and central government regulations. Another deficiency of organic binder systems is their relatively short bench life.

In order to obviate the deficiencies of the organic systems, some foundries use inorganic binder systems. One type of inorganic binder which is widely applied is an aqueous solution of a silicate, such as sodium silicate, i.e., water glass. (See U.S. Pat. No. 4,226,277 herein incorporated by reference). Although the binding properties of the silicates are generally satisfactory they, when compared to organic systems, exhibit lower flowability of the binder/aggregate mixture due to the high viscosity of the silicate. Additionally, when subjected to metal pouring or casting temperatures the silicates tend to fuse making it difficult to remove the fused shapes from castings by mechanical shake-out methods. The fused shapes also lack water solubility which prevents their removal or dissolution by water dispersing.

A second inorganic system, comprised of an aqueous solution of a polyphosphate glass is disclosed in WO 92/06808 which is herein incorporated by reference. These binders, when cured, exhibit satisfactory strengths, excellent rehydration, and breakdown of the aggregate shape after being exposed to metal casting temperatures. Deficiencies of this binder system include: poor humidity resistance, softening of the aggregate system at high temperatures, which restricts its use in ferrous alloy applications; and when compared to the organic binders, low flowability of the aggregate due to relatively high binder levels required for adequate strengths.

A third inorganic system is known which is comprised of a major portion of a finely-divided refractory material mixed with a minor portion of a dry phosphate to which is subsequently added a minor portion of an aqueous alkali metal silicate as disclosed in U.S. Pat. No. 2,895,838 (the entire disclosure of which is incorporated by reference) to make gas curable molds. This composition is chemically reacted with a gaseous agent, such as carbon dioxide, to cure the composition by reacting the phosphate with an alkali metal carbonate formed on curing of the inorganic system with carbon dioxide.

Another known inorganic binder system, which includes a combination of silicate and polyphosphate, is disclosed in the work of D. M. Kukuj et al, "Modification of Waterglass with Phosphorus Containing Inorganic Polymers" (the entire disclosure of which is incorporated by reference.) The method of preparing this binder involved processing of the silicate and polyphosphate at high temperatures and pressures in an autoclave to cause a chemical reaction of the inorganic polymers. The binder was then coated onto sand and was cured using $CO_2$ at ambient temperatures. By this work, only a low level of polyphosphate could be incorporated in the binder preparation. In addition, Kukuj et al found that the maximum strength system had only 5% polyphosphate modifier and the strength dropped off dramatically when the binder contained more than 7% polyphosphate. Kukuj et al also found that small additions of polyphosphate in their binder (about 1 to 3%) caused a dramatic increase in viscosity of the binder prior to its addition to aggregate. Thus, the deficiencies of this system include: high temperature and high pressure processing required to produce the binder; formation of new chemical compounds with high viscosity; and low flowability of the binder/aggregate system. Also, like U.S. Pat. No. 2,895,838, chemical interaction of the binder system with a carbon dioxide containing gas was necessary to cure the system.

Gelling of inorganic binders under appropriate conditions provides binding properties; however, unexpected gelling can occur prior to aggregate incorporation even if there are minor physical and/or chemical changes in the binder solution. Such unintentional gelling is, of course, detrimental to the usefulness of the binder systems, and it has been witnessed in compositions of the present invention.

The present inventors have conducted extensive studies on silicate/phosphate systems and they have achieved unexpected results in view of the results disclosed in U.S. Pat. No. 2,895,838 and by Kukuj et al. The present inventors have also learned that the gelling of inorganic systems prior to aggregate addition is not insurmountable. It has been found by the inventors that if premature gelling occurs in the silicate/phosphate system of the present invention the gelling condition can be overcome if agitation is employed or if an aqueous addition is made or if the pH is upwardly adjusted. By taking these steps, the gelled composition will return to a solution.

SUMMARY OF THE INVENTION

It is a principal object of the invention to provide novel inorganic binder systems as a substitute for organic and inorganic binder systems known in the prior art.

The novel inorganic binder and aggregate systems have improved flowability (lower viscosity), improved humidity resistance and neither fuse nor soften at high temperature, making possible their use with refractories and foundry sands for use as foundry molds or cores in contact with molten metal, including ferrous metal casting processes. In addition, the problems associated with undesired gelation of the binders are avoided in the present invention. Moreover, the binder systems of the present invention produce good hot and cold tensile strength properties in shapes of aggregate bound with the binder of the invention even at low binder levels. The binder systems of the present invention are not limited to narrow silica/soda ratios, nor silicate/phosphate ratio, but are effective over a wide range of proportions.

The phosphates may be orthophosphates, condensed phosphates or mixtures thereof. The phosphates may also be made in situ, in the presence of other ingredients, e.g., silicate and/or aggregate, by addition of a phosphoric acid and base, e.g., sodium hydroxide, or converted from one phosphate to another in situ by addition of acid or base.

An object of the present invention is to produce an inorganic binder system that when mixed with a particulate material can be used to make usable shapes with satisfactory handling and processing properties.

Another object of the present invention is to produce an array of inorganic binder compositions containing silicates and phosphates that, when mixed with a particulate material, can be used to prepare usable shapes.

Another object of the invention is to produce an array of inorganic binder compositions essentially free of organic compounds.

Another object of the invention is to produce an array of binder compositions of low viscosity and which allow for the dissolution of premature gelling of such binder compositions.

Another object of the invention is to produce a binder system containing phosphates for metal, e.g., ferrous, casting.

Another object of the invention is to produce a binder system containing phosphates for non-ferrous and non-metal molding.

Another object of the invention is to produce an array of binder compositions for formed aggregate shapes that exhibit good shakeout or water collapsibility properties after exposure to molten metal casting temperatures for easy removal of the formed shape.

Another object of the invention is to produce a binder which does not deform or soften significantly at temperatures below about 500° C.

Another object of the invention is to produce a binder composition that is heat curable.

It is therefore additional objects of the invention to provide methods of making and methods of using the novel binder systems of the invention to overcome problems associated with the prior art and to form useful cured shapes suitable as molten polymer and metal contacting surfaces, including casting and injection molds, foundry molds, cores and mandrels.

These and other objects of the invention will become apparent after consideration of the following descriptions and examples.

DETAILED DESCRIPTION OF THE INVENTION

The present inventors have found that inorganic binder systems composed of silicates and phosphates are quite versatile for binding particulate material in the manufacture of, for instance, cores, molds, mandrels, particle board, plastic compositions, briquettes and the binding of other shapes to produce shapes of improved hot and cold tensile strength. The inventors have found that a number of variables in the inorganic binder system can be adjusted so that a formulator can tailor a product to the needs of a client. For instance, the formulator can easily adjust the relative amounts of silicate and phosphate to change properties of a particular shape that is formed. Additionally, the use of a specific phosphate or silicate can be chosen by the formulator to obtain the desired results.

In fact, the formulator using the invention can create binder systems exhibiting synergy with respect to hot tensile or cold tensile strengths of particulate molds and cores. One can improve mechanical and wet shakeout properties of formed shapes exposed to molten metal temperatures by using the binders of the invention rather than a binder containing 100% silicate. In addition, the humidity resistance of particulate molds and cores can be improved relative to an all phosphate binder using the binder of the invention. These results can be obtained, even with greater amounts of phosphate present in the binder system than the amounts disclosed in either U.S. Pat. No. 2,895,838 or Kukuj et al.

In addition, the compositions of the invention have the advantage of avoiding carbonates and the special carbon dioxide containing gases needed to produce such carbonates. The cured cores and molds of the present invention also have the advantage of avoiding having excess water. This contrasts with cured shapes of the carbon-dioxide cured process containing amounts of excess water. Such excess water is detrimental when the shape containing the same is exposed to metal casting temperatures. This often leads to poor castings and restricts the use of the cured shapes to simple configurations.

Silicates

The silicates used in the binders of the invention may include the various alkali metal silicates including potassium, sodium, cesium, rubidium and lithium. Other silicates such as ammonium silicates may be used. Generally, the silicates are commercially available as solids or aqueous solutions. Throughout the present application, the silicates, as a component of the binder of the invention, are preferably aqueous alkaline solutions characterized by a solids content of about 45% by weight unless otherwise specified. A solid silicate may optionally be used.

Water glass, i.e., sodium silicate, which is the preferred alkali metal silicate used in the binder of the invention, can be characterized by general formula $xSiO_2 \cdot yNa_2O$. The ratio of x and y, i.e., silica/alkali used in the present invention is from 0.6:1 to 3.85:1, preferably 1.1:1 to 3.22:1 and more preferably 1.1:1 to 2.58:1. Minor amounts of other elements such as alkaline earth metals, aluminum and the like may be present in varying proportions. Water content of sodium silicate can vary, depending on the properties, e.g., viscosity, desired by the end user.

Phosphates

The phosphates used in the binders of the invention include a salt of an oxygen acid of phosphorus including salts of phosphoric acids such as orthophosphoric acid, polyphosphoric acid, pyrophosphoric acid, and metaphosphoric acid. The phosphate employed generally is alkali phosphate which includes both alkali metal phosphates and alkaline earth metal phosphates as well as ammonium phosphates.

As used throughout the specification and claims, the term "phosphate" is intended in a generic sense to include both crystalline and amorphous inorganic phosphates, e.g., sodium phosphate glasses. Further, phosphate is intended to include but not be limited to orthophosphates and condensed phosphates. Orthophosphates are compounds having a monomeric tetrahedral ion unit $(PO_4)^{3-}$. Typical orthophosphates include sodium orthophosphates, e.g., monosodium phosphate, disodium phosphate or trisodium phosphate, potassium orthophosphates and ammonium orthophosphates.

Condensed phosphates are compounds having more than one phosphorus atom, wherein the phosphorus atoms are not bonded to each other. However, each phosphorus atom of the pair is directly bonded to at least one same oxygen atom, e.g., P—O—P. The general class of condensed phosphates in the present application includes linear polyphosphates, metaphosphates, pyrophosphates and ultraphosphates.

Metaphosphates are cyclic structures including the ionic moiety $((PO_3)_n)^{n-}$, wherein n is at least 3, e.g., $(Na_n(PO_3)_n)$. Ultraphosphates are condensed phosphates in which at least some of the $PO_4$ tetrahedra share 3 corner oxygen atoms. Pyrophosphates have an ion of $(P_2O_7)^{4-}$, e.g., $Na_n H_{4-n} (P_2O_7)$ wherein n is 0 to 4.

Linear polyphosphates have linear P—O—P chains and include an ionic moiety of general formula $((PO_3)_nO)$, wherein n is the chain length which ranges from 3 up to several hundreds, e.g., 500, dependent on the number of chain breakers, e.g., $H_2O$ present. Commercial polyphosphate generally contains mixtures of linear polyphosphates and often also metaphosphates and is characterized by an average chain length $n_{avg}$ which ranges from at least 3, typically from 3 to about 45 and is limited to 45 only by the market demands, preferably the average ranges from 3 to 32, most preferably 4 to 21. A preferred category of polyphosphate is that of amorphous condensed phosphates, e.g., water soluble phosphate glasses.

In view of the above teachings, one skilled in the art could produce mixtures of phosphates as defined above and even include small amounts (up to 10%) of modifier ions such as calcium, magnesium, zinc, aluminium, iron or boron in soluble phosphates and produce a phosphate as covered by the range of the present invention.

In general the phosphates are encompassed by the following formula for oxide molar ratio:

$$(xM_1+yM_2+zH_2O):P_2O_5$$

wherein $M_1$ is selected from the group consisting of $Li_2O$, $Na_2O$, $K_2O$, and $(NH_3)_2 \cdot (H_2O)$ and mixtures thereof. $M_2$ is optional and selected from the group consisting of CaO, MgO, ZnO, FeO, $Fe_2O_3$, $Al_2O_3$, $B_2O_3$. The total oxide ratio $R=(x+y+z)/$moles $P_2O_5$ and ranges from about 0.5 to 3.0 or greater, e.g., 5. Typically, phosphates are categorized according to the value of R as follows in Table A:

TABLE A

| R | Phosphate |
|---|---|
| $0.5 \leq R < 1$ | ultraphosphates |
| R = 1 | metaphosphates |
| 1 < R < 2 | polyphosphates |
| R = 2 | pyrophosphates |
| 2 < R < 3 | mixtures of phosphates |
| R = 3 | orthophosphates |
| 3 < R | phosphates plus metal oxide |

It should be noted that the phosphates may be added directly to other ingredients, e.g., aggregate or silicates, or created in situ with the other ingredients. In situ creation may be accomplished by using acids, e.g., any of the phosphoric acids, or bases, e.g., alkali hydroxides, or oxides. For example, phosphoric acid and sodium hydroxide could be added together or sequentially to make a phosphate in situ with other binder ingredients. Phosphates may even convert in situ to other phosphates by addition of base or acid. For example, disodium phosphate may be converted to trisodium phosphate, by addition of sodium hydroxide, or converted to monosodium phosphate, by addition of phosphoric acid.

The phosphates may be used in solid form or as aqueous solutions. The pH of the aqueous solutions may be acidic or alkaline. For condensed phosphates, pH relates to factors such as the chain length of the phosphate.

Particulate

The silicate/phosphate binder components can be used to mold shapes of water-insoluble particulate material made up of, for example, plastics, earth, wood and preferably of a refractory material such as silica, zircon, alumina, chromite, chamotte, olivine, silicon carbide, magnesite, dolomite, aluminum silicate, mullite, carbon, forsterite, chrome ore-magnesite and mixtures thereof. A preferred mold, core, or mandrel for shaping products for foundry applications, for casting products of, for instance, cast iron, brass, bronze, aluminum and other alloys and metals is produced from any of the sands identified above. Sand molds, cores, and mandrels are well known to those of ordinary skill in the art.

Binder (Composed of a Silicate Component and a Phosphate Component)

The amount of a particular binder component (silicate or phosphate component) and the total binder amount used to create a shape, such as a mold, core, or mandrel depends on the strength requirements as well as the shakeout and/or water collapsibility requirements of the shape.

The total weight percent of the binder, based on the weight of the particulate material used to form a shape, is defined by the amount of solids present in the combined binder components unless otherwise specified. In the present invention, weight percent solids of the binder, based on the weight of particulate material, is preferably 0.4–5.0% and more preferably 0.4–2.5% and most preferably 0.6–1.6%.

The ratio of silicate/phosphate in the binder formed of a silicate component and phosphate component of the invention is 97.5:2.5 to 5:95; preferably to 95:5 to 25:75 and most preferably 90:10 to 50:50. Ratios within the range of 39:1 to 31:1 and 1:2 to 1:19 are also of particular interest.

The silicate and phosphate components are mixed and not otherwise subjected to high temperatures prior to mixing the binder with the aggregate. By high temperature is meant above about 90° C. Preferably, the binders are mixed at ambient or near ambient temperature.

Additives

Additives are used for special cases for special requirements. The binder systems of the invention may include a wide variety of additional materials. Such materials include alkaline hydroxides, e.g., NaOH, water and various organic and inorganic additives. NaOH (45%–50% solutions for example) may be present in the binder of the invention in amounts of up to 10%–40% by weight (solutions). Additional water may be present in amounts of 0%–15% of the binder by weight. Preferably, aqueous binders of the present invention contain water in an amount from about 30 to about 80% by weight of the binder. Minor amounts of other additives, such as surfactants, may be present. The surfactants may be anionic, nonionic, cationic, amphoretic or mixtures thereof. Examples of water soluble surfactants are anionic surfactants selected from organic sulphates, organic sulphonates and organic phosphate esters, e.g., potassium 2-ethylhexyl phosphate. Certain surfactants also operate as flow control agents. A typical flow control agent includes an agent sold under the tradename PA 800K, more completely defined as potassium 2-ethylhexyl phosphate which is commercially available from LAKELAND LABORATORIES Ltd., Manchester, England. Other flow control agents include 2-ethylhexyl acid phosphate, DISPERSE-AYD W28 anionic/non-ionic surfactant sold by Daniel Products, 400 Claremont Avenue, Jersey City, N.J., USA, and DISPEX N40V, a sodium salt of a polyacrylate sold by Allied Colloids, Suffolk, Va., USA. Other additives include humidity resistant additives, collapsibility (or breakdown) enhancers, preservatives, dyes, bulking agents, hot strength additives, or flow enhancers. Humidity resistant additives include potassium tetraborate, zinc carbonate, zinc oxide. Collapsibility (or breakdown) enhancers include sugar, e.g., sucrose, dextrin and sawdust. Still other additives include mold release agents, adhesion promoters, e.g., silanes, metal casting improvement additives, e.g., red iron oxide, black iron oxide, or clay, etc. Refractory coatings may be used to improve casting finishes. Of course, the additives may be added in combination or singly.

Mixing the Binder and Particulate

The procedure for mixing binder with water-insoluble particulate may include modifying, if necessary, the silica/soda ratio of the sodium silicate by treating the sodium silicate with an alkali. In general, an alkaline aqueous sodium silicate solution having an appropriate ratio of silica to soda is added to a foundry aggregate by pouring the solution into a mixer. Next, an aqueous phosphate is added and mixed and a flow agent is optionally added followed by additional mixing.

Alternatively, a solid phosphate component may be included in the particulate, which is first mixed with water, and then an aqueous alkaline sodium silicate solution is added thereto. This composition is well mixed.

In yet an additional alternative, the silicate and phosphate components can be premixed together to form an aqueous solution and even stored in this condition prior to being added to sand. In at least some embodiments the premixed solution is a clear (transparent) mixture at least prior to mixture with aggregate.

In yet another alternative, the silicate, phosphate and aggregate components may be dry mixed and stored in that condition. When ready, water may be added to this dry mixture.

As an alternative to providing the phosphate as a separate ingredient, it may be formed in situ by adding phosphoric acid and a base as binder ingredients before or after mixing with aggregate or silicate. Moreover, the phosphate in the binder may be changed to a different phosphate in situ by addition of acid or base.

After the binder and particulate are mixed, the mixture is charged into a pattern to form a shape and the shape is cured. Curing is accomplished by dehydrating the shape by generally driving off free water. Preferably, the shape is dehydrated to less than 1% water by weight by blowing inert gas through the shape, drawing a vacuum through the shape, and/or heating.

As used throughout the specification and claims, the term "mold" is intended in a generic sense to mean casting forms which include both molds and cores, this invention in no manner being limited to the former. Moreover, "mold" is intended to include various patterns for use in the molding art including casting and injection molds, as well as shell molds including shell mold-forming elements in addition to a completed shell mold structure prepared by assembling two or more complementary thin-walled shell mold elements. Hence, it will be appreciated that the term "mold" is used to include a shaping or casting-defining surface broadly, and specifically encompasses molds, cores and mandrels.

The invention can be further illustrated by reference to the non-limiting examples as set forth below:

Heated Box Air-Assisted Process

General Procedure

A binder containing an aqueous sodium silicate solution having an $SiO_2/Na_2O$ ratio of 3.22, i.e., commercially available from OXYCHEM and sold under the designation "Grade 42" (having a solids content of 38.3%) and/or an aqueous polyphosphate solution having an average chain length of 21, wherein the silicate and/or phosphate are present as shown on Table 1, were added to sand as follows:

3000 gm WEDRON 530 silica sand was placed in a Hobart mixing bowl. Two depressions were made in the sand. Appropriate amounts (see Table 1) of aqueous sodium silicate and/or sodium polyphosphate (1.57% total solids binder level, based on sand), were placed into separate depressions. The mixer was started and mixing was continued for 2 minutes. Care was exercised to ensure even mixing of the binder components. Coated sand was then blown at 85 psi air pressure for 1 second into a three-cavity dog bone core box, which was equilibrated at 105° C.±5°, using a Redford Cartridge Bench Core Blower (Redford Iron and Equipment Company, Detroit, Mich.). Curing was accomplished by blowing air at 120° C.±5° through the core box at 30 psi for 60 seconds. Using the above methodology, additional sets of dog bones were made from the same, respective, sand mixes and tested to determine average values of hot tensile strength (Table 1), cold tensile strength (Table 2), retained strength after 15 minutes treatment at 925° C. (Table 6), and time to soften by water after 15 minute treatment at 925° C. (Table 7). The Example numbers of Table 1 should be also used in association with Tables 2, 6 and 7. The values reported on the tables below are generally averages of at least three measurements.

EXAMPLE 1 (Comparison)

This example employed the above procedure with the aqueous sodium silicate solution having an $SiO_2/Na_2O$ ratio of 3.22, i.e., commercially available from OXYCHEM and sold under the designations "Grade 42" (having a solids content of 38.3%).

EXAMPLES 2–9

The procedure described above was repeated wherein the weight ratio of silicate to phosphate was varied as shown in the first row of Table 1 below.

EXAMPLE 10 (Comparison)

The general procedure described above was repeated using 100% of the phosphate binder (see the extreme right column of the Weight Ratio of Silicate to Phosphate data of Table 1 below).

EXAMPLES 12–19, 22–29 and 32–39

The procedure of Example 2 was repeated except a commercially available sodium silicate having an $SiO_2/Na_2O$ ratio of 2.58 was used in all instances, and a polyphosphate having an average chain length of 32 was used for Examples 12–19; an average chain length of 21 was used for Examples 22–29, and an average chain length of 7 was used for Examples 32–39.

All Examples starting from Example 12 were completed with 45 wt. % solutions of silicate and 45 wt. % solutions of phosphate.

EXAMPLE PAIRS 11,20; 21,30 and 31,40
(Comparison)

Comparative examples, shown in the extreme left and right columns of the Weight Ratio of Silicate to Phosphate data of Table 1 were prepared containing, in the first instance (i.e., in Examples 11,21 and 31), 100% sodium silicate with $SiO_2/Na_2O$ ratios of 2.58 and in the second instance (i.e., in Examples 20, 30 and 40), 100% polyphosphates with average chain lengths of 32, 21 and 7 respectively.

EXAMPLES 42–49, 52–59 and 62–69

These examples were prepared as in Example 2, except that a silicate having an $SiO_2/Na_2O$ ratio of 2.00 (which is commercially available) was used, and the average polyphosphate chain length was varied as 32, 21, 7 as above.

EXAMPLE PAIRS 41,50; 51,60 and 61,70
(Comparison)

Comparative examples shown in the extreme left and right columns of the Weight Ratio of Silicate to Phosphate data of Table 1 were prepared containing in the first instance (i.e., in Examples 41, 51 and 61), 100% sodium silicate with $SiO_2/Na_2O$ ratios of 2.00 and in the second instance (i.e., in Examples 50, 60 and 70), 100% polyphosphates with average chain lengths of 32, 21 and 7.

EXAMPLES 72–79, 82–89 and 92–99

These examples were obtained as described in Example 2 above except a sodium silicate with an $SiO_2/Na_2O$ ratio of 1.60 was used, and the average chain length of polyphosphate was varied as shown in Table 1. A silicate having an $SiO_2/Na_2O$ ratio of 1.60 is not commercially available but can be produced by adding 22.06 grams of 45% NaOH to 100 grams of an aqueous sodium silicate having an $SiO_2/Na_2O$ ratio of 2.58.

EXAMPLE PAIRS 71,80; 81,90 and 91,100
(Comparison)

Comparative examples, shown in the extreme left and right columns of the Weight Ratio of Silicate to Phosphate data of Table 1 were prepared containing, in the first instance (Examples 71, 81 and 91), 100% sodium silicate with $SiO_2/Na_2O$ ratios of 1.60 and in the second instance (Examples 80, 90 and 100), 100% polyphosphates with average chain lengths of 32, 21 and 7.

EXAMPLES 102–109, 112–119 and 123–130

The procedure for obtaining these examples was repeated as set forth in Example 2 above, except a silicate having an $SiO_2/Na_2O$ ratio of 1.30 was used which is not commercially available. It can be produced however by adding 35.49 grams of a 45% NaOH to 100 grams of an aqueous sodium silicate having an $SiO_2/Na_2O$ ratio of 2.58.

EXAMPLE PAIRS 101,110; 111,120 and 121,130
(Comparison)

Comparative examples, shown in the extreme left and right columns of the Weight Ratio of Silicate to Phosphate data of Table 1 were prepared containing, in the first instance (Examples 101, 111 and 121), 100% sodium silicate with $SiO_2/Na_2O$ ratios of 1.30 and in the second instance (Examples 110, 120 and 130), 100% phosphates with average chain lengths of 32, 21 and 7.

EXAMPLES 132–139, 142–149 and 152–159

The procedure for obtaining these examples was repeated as set forth in Example 2 above, except a silicate having an $SiO_2/Na_2O$ ratio of 1.00 was used which is not commercially available. It can be produced, however, by adding 56.95 grams of 45% NaOH to 100 grams of an aqueous sodium silicate having an $SiO_2/Na_2O$ ratio of 2.58.

EXAMPLE PAIRS 131,140; 141,150 and 151,160

Comparative examples, shown in the extreme left and right columns of the Weight Ratio of Silicate to Phosphate data of Table 1 were prepared containing, in the first instance (Examples 131, 141 and 151), 100% sodium silicate with $SiO_2/Na_2O$ ratios of 1.00 and in the second instance (Examples 140, 150 and 160), 100% phosphates with average chain lengths of 32, 21 and 7.

TABLE 1

| | | | Hot Tensile Strength (in psi) of Cured Aggregate with Binders | | | | | | | | |
|---|---|---|---|---|---|---|---|---|---|---|---|
| Example No. | Silicate SiO2/Na2O Ratio | Phosphate Chain Length | Weight Ratio of Silicate to Phosphate (Based on Solids Weight) | | | | | | | | |
| | | | 100:0 | 90:10 | 83.3:16.7 | 75:25 | 60:40 | 50:50 | 40:60 | 25:75 | 16.7:83.3 | 0:100 |
| 1–10 | 3.22-a | 21 | 109 | 117 | 124 | 113 | 86 | 54 | 39 | 25 | 30 | 50-c |
| 11–20 | 2.58 | 32 | 112-c | 117 | 124 | 135 | 131 | 112 | 91 | 64 | 46 | 68-c |
| 21–30 | 2.58 | 21 | 112-c | 116 | 128 | 148 | 125 | 148 | 90 | 56 | 34 | 50-c |
| 31–40 | 2.58 | 7 | 112-c | 120 | 151 | 163 | 119 | 88 | 66 | 73 | 27 | 16 |
| 41–50 | 2.00 | 32 | 54-c | 67 | 86 | 91 | 101 | 89 | 95 | 98 | 66 | 68-c |
| 51–60 | 2.00 | 21 | 54-c | 75 | 68 | 91 | 128 | 118 | 112 | 86 | 52 | 50-c |
| 61–70 | 2.00 | 7 | 54-c | 58 | 60 | 75 | 117 | 72 | 87 | 61 | 59 | 16 |
| 71–80 | 1.60-b | 32 | d | | d | | 70 | 142 | 124 | | | 68-c |
| 81–90 | 1.60-b | 21 | d | d | 56 | 58 | 89 | 115 | 82 | 55 | 65 | 50-c |
| 91–100 | 1.60-b | 7 | d | | | 62 | 82 | 85 | 53 | | | 16 |
| 101–110 | 1.30-b | 32 | d | | | d | 134 | 110 | | | | 68-c |

TABLE 1-continued

Hot Tensile Strength (in psi) of Cured Aggregate with Binders

| Example No. | Silicate SiO2/Na2O Ratio | Phosphate Chain Length | \multicolumn{10}{c}{Weight Ratio of Silicate to Phosphate (Based on Solids Weight)} | | | | | | | | | |
|---|---|---|---|---|---|---|---|---|---|---|---|---|
| | | | 100:0 | 90:10 | 83.3:16.7 | 75:25 | 60:40 | 50:50 | 40:60 | 25:75 | 16.7:83.3 | 0:100 |
| 111–120 | 1.30-b | 21 | d | d | d | d | 106 | 124 | 83 | 29 | 43 | 50-c |
| 121–130 | 1.30-b | 7 | d | | | f | 123 | 102 | 61 | | | 16 |
| 131–140 | 1.00-b | 32 | d | | | | 105 | 105 | | | | 68-c |
| 141–150 | 1,00-b | 21 | d | d | d | d | 97 | 101 | 52 | d | d | 50-c |
| 151–160 | 1.00-b | 7 | d | | | | d | 78 | | | | 16 |

The following key should be used in association with Tables 1, 2, 6, 7, 15, 16, 17 and 18.
  a. This sodium silicate is commercially available as a 38.3% solids solution. The binder level used was adjusted so that the same solids level was used in other experiments.
  b. Sodium silicate liquid with this $SiO_2$ to $Na_2O$ ratio is not commercially available.
  However, $SiO_2$ to $Na_2O$ ratio was adjusted by adding appropriate quantities of 45% NaOH to 2.58 ratio silicate.
  c. Averages of two experiments are reported.
  d. Under the experimental conditions, it was difficult to make dog bones. In severe cases, no dog bones were successfully made. When the core box opened, the dog bones broke. However, there is evidence that the binder was cured under these conditions.

Note 1: Where blank spaces appear in Tables 1, 2, 6, 7 and 15–18. This indicates the experiment was not run. Thus, no dog bone was produced. For example, Example 72 is a phantom example, no dog bone was produced.

Note 2: ND in all the Tables and elsewhere means "not determined".

Hot and Cold Tensile Strengths

After curing, the core box was opened and the dog bones were removed. One dog bone was used for immediate (hot) tensile strength determination (Table 1 above). All tensile strength measurements were made with an Electronic Tensile Tester Model ZGII-XS (Thwing-Albert Instrument Company, Philadelphia, Pa.). As used throughout the specification and claims "hot" tensile strength means the strength of the shape as "stripped" from its pattern and "cold" tensile strength means the strength 30 minutes after stripping of the shape from its pattern. Hot and cold tensile strength properties are critical in developing a commercial binder system. It is essential that cores and molds made with these binders will have enough strength to be manipulated during core and mold making and handling. As shown in Table 1, synergistic hot tensile strength results are obtained using a combination binder of sodium silicate and sodium polyphosphate versus binders containing either 100% sodium silicate or binders containing 100% phosphate. These results can be manipulated, as depicted in Table 1 by adjusting the $SiO_2/Na_2O$ ratio of the sodium silicate binder, by varying the average chain length of the phosphate component or by changing the weight ratio of the silicate component/ phosphate component. As shown, maximum hot tensiles in these series of non-limiting examples is obtained for Examples 33 and 34, respectively, (151 psi and 163 psi respectively), using a sodium silicate component having an $SiO_2/Na_2O$ ratio of 2.58, a polyphosphate component having an average chain length of 7 and weight ratios of the sodium silicate binder component:polyphosphate binder component of 83.3:16.7 (Example 33) and 75:25 (Example 34). In general, for a given sodium silicate in the combination binder systems of the invention the impact of sodium polyphosphates on hot tensile strength was relatively small when compared at the same silicate level. This is best shown in the series of experiments with 2.58 and 2.00 silicates.

On the contrary, sodium silicate is essential for obtaining good hot strengths of the systems. While combination binders with the 2.58 ratio silicate appeared to have the highest hot strength overall, there are some binder systems with the 3.22 and 2.00 silicate ratios that produce hot strengths approaching those with a 2.58 ratio silicate.

It should be noted that the addition of sodium polyphosphates in low ratio silicates (<2.0 ratio) allowed preparation of dog bones in some examples shown on Table 1.

The remaining 2 dog bones were used for determining cold tensile strength (Table 2), and dog bone weight. Cold tensile strengths and dog bone weight were measured after the dog bones were cooled for thirty minutes. Dog bone weight comparisons (not shown in Tables) provide a good gauge of the flowability of binder/aggregate systems. Heavier dog bones indicate a better flowability. In general dog bones prepared from 100% silicate binders weighed less than dog bones prepared with silicate/phosphate combination binders. These results indicate that aggregate or particulate materials coated with the combination binder of the invention have improved flow properties.

As shown in Table 2, synergistic cold tensile strength results are obtained using a combination binder of sodium silicate and polyphosphate (see especially Examples 43, 44, 52, 53, 54 and 64) versus binders containing either 100% sodium silicate or binders containing 100% phosphates. These results can be further manipulated, as depicted in Table 2 by adjusting the $SiO_2/Na_2O$ ratio of the sodium silicate liquid component, varying the chain length of the polyphosphate component or by changing the weight ratio of silicate component/polyphosphate component.

Generally, Table 2 also shows that dog bones produced with the sodium silicates having 2.58 and 2.00 $SiO_2/Na_2O$ ratios exhibit the highest cold tensile overall and with the widest range of the silicate to polyphosphate ratio having good cold tensile strength. It is important to point out that, for low ratio silicates (<2.0 ratio), the addition of polyphosphate allows for the preparation of dog bones shown in Table 2.

TABLE 2

Cold Tensile Strength (in psi) of Cured Aggregate with Binders

| Silicate SiO2/Na2O Ratio | Phosphate Chain Length | Weight Ratio of Silicate to Phosphate (Based on Solids Weight) | | | | | | | | | |
|---|---|---|---|---|---|---|---|---|---|---|---|
| | | 100:0 | 90:10 | 83.3:16.7 | 75:25 | 60:40 | 50:50 | 40:60 | 25:75 | 16.7:83.3 | 0:100 |
| 3.22-a | 21 | 295 | 322 | 242 | 227 | 137 | 3 | 1 | 5 | 26 | 129-c |
| 2.58 | 32 | 375-c | 406 | 352 | 327 | 247 | 145 | 119 | 81 | 50 | 157-c |
| 2.58 | 21 | 375-c | 401 | 363 | 383 | 286 | 181 | 122 | 62 | 31 | 129-c |
| 2.58 | 7 | 375-c | 390 | 390 | 367 | 241 | 103 | 108 | 81 | 76 | 170 |
| 2.00 | 32 | 384-c | 375 | 444 | 403 | 303 | 103 | 127 | 97 | 113 | 157-c |
| 2.00 | 21 | 384-c | 415 | 403 | 421 | 397 | 136 | 141 | 59 | 87 | 129-c |
| 2.00 | 7 | 384-c | 381 | 419 | 426 | 377 | 142 | 120 | 113 | 109 | 170 |
| 1.60-b | 32 | d | | d | 353 | 288 | 168 | | | | 157-c |
| 1.60-b | 21 | d | d | 348 | 339 | 337 | 157 | 99 | 127 | 59 | 129-c |
| 1.60-b | 7 | d | | | 335 | 354 | 245 | 83 | | | 170 |
| 1.30-b | 32 | d | | | d | 307 | 199 | | | | 157-c |
| 1.30-b | 21 | d | d | d | d | 280 | 201 | 114 | 153 | 132 | 129-c |
| 1.30-b | 7 | d | | | d | 316 | 283 | 126 | | | 170 |
| 1.00-b | 32 | d | | | | 201 | 195 | | | | 157-c |
| 1.00-b | 21 | d | d | d | d | 205 | 197 | 71 | d | d | 129-c |
| 1.00-b | 7 | d | | | | d | 219 | | | | 170 |

Effect of Employing Various Phosphates

The phosphate component of the binder can be prepared from a variety of phosphates as reported above. In general, the phosphates have an average chain length value of n, n being the average number of phosphate groups in the chain. Table 3 exemplifies the variety of phosphates employable in the present invention. As shown in Table 3, binder compositions containing phosphate chains wherein n=1, 2, 3, 4 and 21 were used to make dog bones.

The phosphates were dissolved in water to give 45% (by weight) solutions in most examples. If 45% solutions could not be made, saturated phosphate solutions were made and adjustments were made to account for the differences in solids. It was observed that sodium tripolyphosphate is not very soluble in water. Only a 14% (by weight solution) could be prepared. To maintain a silicate to phosphate ratio consistent with the other binders of Table 3, additional sodium tripolyphosphate solution was added to the binder.

The binder components were mixed with sand, charged to a three-dog bone core box and cured by driving off water. Dog bones with the combination binder of the invention were successfully produced using the various phosphate compounds as listed in the heading of Table 3.

TABLE 3

Aggregate Prepared with Various Phosphates

| | Sodium Polyphosphate (n = 4) BUDIT 9-f | Sodium Tripolyphosphate-d (n = 3) $Na_5P_3O_{10}$ | Potassium Pyrophosphate (n = 2) $(K_2P_2O_7)$ | Potassium Hydrogen Phosphate (n = 1) $K_2HPO_4$ | Sodium Dihydrogen Phosphate (n = 1) $NaH_2PO_4$ | Potassium Phosphate (n = 1) $K_3PO_4$ | VITRAFOS-e (control) (n = 21) |
|---|---|---|---|---|---|---|---|
| Sodium Silicate Solids Level, %, BOS-a | 1.181 | 1.181 | 1.181 | 1.181 | 1.181 | 1.181 | 1.181 |
| Phosphate Solids Level, %, BOS-b | 0.394 | 0.394 | 0.394 | 0.394 | 0.394 | 0.394 | 0.394 |
| Total Binder Solids Level, %, BOS | 1.575 | 1.575 | 1.575 | 1.575 | 1.575 | 1.575 | 1.575 |
| Hot Tensile, psi | 141-c | 87-d | 109 | 106 | 33 | 72 | 148 |
| Cold Tensile, psi | 370-c | 163-d | 312 | 337 | 41 | 392 | 383 |
| Retained Strength, psi | 2 | 3-d | 40 | 10 | 4 | 128 | 3 |
| Softening by water, seconds | 5 | 15-d | 10 | 5 | 3 | >20 min. | 5 |

The following key is associated with Table 3.
a. Sodium silicate has a $SiO_2$ to $Na_2O$ weight ratio of 2.58. BOS is defined as weight based on sand weight.
b. Phosphates were dissolved in water to give 45% (by weight) solutions. If 45% solutions could not be made, saturated phosphate solutions were made and adjustments were made to account for the differences in solids.
c. Average of two tests.
d. Sodium tripolyphosphate is not very soluble in water. Only 14% (by weight solution) could be prepared. To maintain the silicate to phosphate ratio, additional water was present in the binder. A longer cure time (90 seconds) was used to completely remove water during curing.
e. VITRAFOS is a sodium polyphosphate available from Rhone-Poulenc Basic Chemicals Co., Shelton, CT.
f. BUDIT 9 is a sodium polyphosphate available from Cometals, Inc., New York, NY.

The following key is associated with Table 3.

a. Sodium silicate has a $SiO_2$ to $Na_2O$ weight ratio of 2.58. BOS is defined as weight based on sand weight.

b. Phosphates were dissolved in water to give 45% (by weight) solutions. If 45% solutions could not be made, saturated phosphate solutions were made and adjustments were made to account for the differences in solids.

c. Average of two tests.

d. Sodium tripolyphosphate is not very soluble in water. Only 14% (by weight solution) could be prepared. To maintain the silicate to phosphate ratio, additional water was present in the binder. A longer cure time (90 seconds) was used to completely remove water during curing.

e. VITRAFOS is a sodium polyphosphate available from Rhône-Poulenc Basic Chemicals Co., Shelton, Conn.

f. BUDIT 9 is a sodium polyphosphate available from Cometals, Inc., New York, N.Y.

Gelling When Mixing Silicates and Phosphates

As discussed above, unexpected gelling can occur in these inorganic systems even if there are only minor physical and/or chemical changes in the solution. Premature or undesirable gelling of the inorganic polymers prior to their addition to aggregate or particulate is detrimental to the usefulness of the binder systems.

Experiments were conducted to study the propensity of gelling of the binder system of the invention. Sodium silicates and polyphosphates were mixed in various ratios. Observations were made as they were mixed. Results are shown in Table 4.

TABLE 4

Gelling of Mixtures of Sodium Silicates and Polyphosphates

| | Weight % of Sodium Silicate | | | | |
|---|---|---|---|---|---|
| | 90 | 70 | 50 | 30 | 10 |
| Sodium Silicate, ratio 2.58 | | | | | |
| Sodium polyphosphate, n = 32 | clear | clear | clear | gel | gel |
| Sodium polyphosphate, n = 21 | clear | clear | clear | gel | gel |
| Sodium polyphosphate, n = 7 | clear | clear | clear | gel | gel |
| Sodium Silicate, ratio 2.00 | | | | | |
| Sodium polyphosphate, n = 32 | clear | clear | clear | clear | gel |
| Sodium polyphosphate, n = 21 | clear | clear | clear | clear | gel |
| Sodium polyphosphate, n = 7 | clear | clear | clear | clear | gel |

In all cases, when sodium silicates (ratios 2.00 and 2.58) and sodium polyphosphates (average chain length=7, 21 and 32) were mixed, a gel was formed as these materials came in contact with each other.

For mixtures in which the 2.58 ratio sodium silicate component accounted for more than 30% (by weight) of the total mixture, the gel was dissolved with agitation (i.e., clear solutions were obtained). Usually, the gel dissolved in less than an hour. As the gel dissolved, usually a small amount of fluffy particles were observed in the solution.

For the mixtures containing 30% by weight or less of the 2.58 ratio sodium silicate, the gel was unaffected by agitation for an extended period (48 hours). On the contrary, for the 2.00 ratio sodium silicate, the gel formed in combining 30% sodium silicate and 70% polyphosphate (by weight) was dissolved with agitation, suggesting a higher solubility of the gel in more alkaline silicate liquids.

Another important observation is that all gels readily dissolved with the addition of water, alkaline hydroxide and/or ammonium hydroxide. Dissolution of the gel by water and/or sodium hydroxide addition is presented in Table 5.

TABLE 5

Effect of Sodium Hydroxide and Water on Gel Obtained from 2.58 Sodium Silicate and VITRAFOS

| | 10 | 20 | 30 | 40 | 50 |
|---|---|---|---|---|---|
| | Weight % of Added Sodium Hydroxide (BOR) | | | | |
| Effect on Gel-a | dissolved | dissolved | dissolved | dissolved | dissolved |
| | Weight % of Added Water (BOR) | | | | |
| Effect on Gel-a | partially dissolved | partially dissolved | partially dissolved | dissolved | dissolved | a. Gels were formed by combining 75 weight % sodium silicate (2.58 silica/soda ratio) and 25 weight percent of VITRAFOS (45% solution)

a. Gels were formed by combining 75 weight % sodium silicate (2.58 silica/soda ratio) and 25 weight percent of VITRAFOS (45% solution) As shown in Table 5, sodium hydroxide solutions were quite effective in dissolving gels produced by forming a combination binder of silicate and polyphosphate. Of course, other alkalis such as KOH, $NH_4OH$, LiOH, etc. can be used. Water alone was also effective in dissolving the gels; however, a large amount of water was required to dissolve such gels.

Flowability

The combination binders of the present invention have reduced viscosity as shown in the Physical Properties in Table 5A. When binder of reduced viscosity is mixed with aggregate, it will impart improved flow to the mixture. This permits flow into molds of intricate shape. The flowability can be further enhanced by addition of flow enhancers and/or flow control agents, if desired. In Table 5A BOR stands for weight based on resin weight.

TABLE 5A

Physical Properties of Silicate/Phosphate Binders

| | Binder Composition, weight % BOR | | | | | |
|---|---|---|---|---|---|---|
| Sodium Silicate Component[a] | 100 | 75 | 60 | 50 | 0 | 50[c] |
| Sodium Phosphate Component[b] | 0 | 25 | 40 | 1 | 100 | 50 |
| | Properties | | | | | |
| Viscosity, cP | 444 | 178 | 116 | 109 | 41 | 107 |
| Specific Gravity | 1.489 | 1.486 | 1.485 | 1.479 | 1.457 | 1.457 |
| pH | 11.9 | 11.7 | 11.6 | 11.5 | 4.3 | 12.4 |
| Refractive Index | 1.4156 | 1.4105 | 1.4066 | 1.4053 | 1.3954 | 1.4085 |

[a]Silica to soda weight ratio is 2.58.
[b]Phosphate component is 45% solution, the phosphate is VITRAFOS having chain length 21.
[c]Silica to soda ratio is 2.0.

Shakeout

A major drawback of the sodium silicate binder is its poor mechanical hot and cold shakeout or collapsibility properties. During the casting process, when temperatures of cores and molds reach temperatures above 700° C., sodium silicate is thermally transformed to a glassy matrix and this results in difficult mechanical shakeouts. Mechanical shakeouts are typically performed by vibrating or impacting the cast metal combining the core. In fact, difficult mechanical shakeout can lead to stress in cast metal. In such cases, it is necessary to treat or anneal the casting to recover the properties of the metal. In such cases, it is necessary to heat treat or anneal the casting to recover the malleability of the metal.

Collapsibility of 100% silicate binder is also difficult due to the insolubility of the glassy silicate matrix formed by exposing a mold or core to temperatures of molten metal. In the invention, fluid, such as water, may be used to collapse the core and flush out the refractory sands for recovery and reuse.

The phosphates alone also exhibit poor hot and cold mechanical shakeout properties after exposure to casting temperatures. Data in Table 6 shows that dog bones produced with the combination binders of the invention, and subjected to temperatures of 925° C. in a muffle furnace for fifteen minutes, have much more favorable collapsibility and shakeout properties (less retained tensile strength as tested on a Thwing Albert tester), than the shakeout properties of dog bones produced with 100% of a single (100% silicate or 100% phosphate) binder component. Of course, the more favorable the mechanical shakeout properties, the less likely damage will occur to the metal castings. In view of the above, the binders of the invention are recommended in the production of cast metals, especially ferrous castings.

TABLE 6

Retained Strength (925° C.) of Cured Aggregates with Binders

| Silicate SiO2/Na2O Ratio | Phosphate Chain Length | Weight Ratio of Silicate to Phosphate | | | | | | | | |
|---|---|---|---|---|---|---|---|---|---|---|
| | | 100:0 | 90:10 | 83.3:16.7 | 75:25 | 60:40 | 50:50 | 40:60 | 25:75 | 16.7:83.3 | 0:100 |
| 3.22-a | 21 | 4 | 5 | 3 | 2 | 0 | 2 | 7 | 11 | 8 | 27-c |
| 2.58 | 32 | 74-c | 9 | 3 | 2 | 1 | 2 | 1 | 8 | 19 | 17-c |
| 2.58 | 21 | 74-c | 4 | 3 | 3 | <1 | <1 | <1 | <1 | <1 | 27-c |
| 2.58 | 7 | 74-c | 6 | 4 | <1 | 2 | <1 | <1 | 1 | 7 | 6 |
| 2.00 | 32 | 65-c | 6 | 2 | 5 | 1 | <1 | 1 | <1 | <1 | 17-c |
| 2.00 | 21 | 65-c | 8 | 11 | 6 | 3 | 1 | 1 | 3 | 3 | 27-c |
| 2.00 | 7 | 65-c | 6 | 17 | 6 | 2 | <1 | <1 | 5 | 5 | 6 |
| 1.60-b | 32 | d | | d | | 11 | 7 | 0 | | | 17-c |
| 1.60-b | 21 | d | d | 8 | 15 | 4 | 0 | <1 | 14 | 9 | 27-c |
| 1.60-b | 7 | d | | | d | 16 | 1 | 0 | | | 6 |
| 1.30-b | 32 | d | d | | d | 5 | 0 | | | | 17-c |
| 1.30-b | 21 | d | d | d | d | 12 | ND | ND | 10 | 12 | 27-c |
| 1.30-b | 7 | d | | | d | 8 | 4 | 0 | | | 6 |
| 1.00-b | 32 | d | | | | 22 | 2 | | | | 17-c |
| 1.00-b | 21 | d | d | d | d | 5 | 4 | 0 | d | d | 27-c |
| 1.00-b | 7 | d | | | | d | 0 | | | | 6 |

Table 7 depicts the softening and thus, the reclamation properties of the binder systems of the invention when water is used as an agent to recover the aggregate. The reported results suggest that many of the combination binders can be dispersed by water more easily than systems with sodium silicate and polyphosphate binders alone. The more rapid softening of the combination binders suggest easier removal of spent binder on aggregate. This of course, translates to benefits in aggregate reclamation.

TABLE 7

Time to Soften Heat Treated Specimen of Cured Aggregate with Binders (in Seconds) by Water

| Silicate SiO2/Na2O Ratio | Phosphate Chain Length | Weight Ratio of Silicate to Phosphate | | | | | | | | |
|---|---|---|---|---|---|---|---|---|---|---|
| | | 100:0 | 90:10 | 83.3:16.7 | 75:25 | 60:40 | 50:50 | 40:60 | 25:75 | 16.7:83.3 | 0:100 |
| 3.22-a | 21 | 5 | 5 | 4 | 4 | 3 | 2 | 2 | 4 | 5 | 80 |
| 2.58 | 32 | >20 min. | 300 | 18 | 6 | 3 | 2 | 6 | 12 | 15 | 80 |
| 2.58 | 21 | >20 min. | 80 | 10 | 5 | 2 | 2 | 2 | 2 | 5 | 80 |
| 2.58 | 7 | >20 min. | 80 | 60 | 10 | 6 | 3 | 4 | 6 | 15 | 20 |
| 2.00 | 32 | >20 min. | >20 min. | 120 | 3 | 3 | 2 | 3 | 3 | 2 | 80 |
| 2.00 | 21 | >20 min. | >20 min. | >20 min. | ~100 | 10 | 5 | 2 | 4 | 6 | 80 |
| 2.00 | 7 | >20 min. | ND | 8 | 4 | 3 | 3 | 4 | 4 | 5 | 20 |
| 1.60-b | 32 | c | | c | 2 | 2 | 2 | | | | 80 |
| 1.60-b | 21 | c | c | ND | 5 | 2 | 2 | ND | ND | ND | 80 |
| 1.60-b | 7 | c | | | ND | 3 | 2 | ND | | | 20 |
| 1.30-b | 32 | c | c | | c | 3 | ND | | | | 80 |
| 1.30-b | 21 | c | c | c | c | 2 | ND | ND | ND | ND | 80 |
| 1.30-b | 7 | c | | | c | 4 | 3 | ND | | | 20 |

TABLE 7-continued

Time to Soften Heat Treated Specimen of Cured Aggregate with Binders (in Seconds) by Water

| Silicate SiO2/Na2O Ratio | Phosphate Chain Length | Weight Ratio of Silicate to Phosphate | | | | | | | | |
|---|---|---|---|---|---|---|---|---|---|---|
| | | 100:0 | 90:10 | 83.3:16.7 | 75:25 | 60:40 | 50:50 | 40:60 | 25:75 | 16.7:83.3 | 0:100 |
| 1.00-b | 32 | c | | | | 2 | 2 | | | | 80 |
| 1.00-b | 21 | c | c | c | c | ND | ND | ND | c | c | 80 |
| 1.00-b | 7 | c | | | | c | 2 | | | | 20 |

Hydroxides other than sodium hydroxide can be used with success in modifying the sodium silicates. Table 8 below shows that potassium and ammonium hydroxides can be successfully used in applications of the invention. Mixtures of such hydroxides can also be used.

TABLE 8

Physical Properties of Cured Aggregate With the Binder and Added Hydroxides

| | Sodium Hydroxide | Potassium Hydroxide | Ammonium Hydroxide | None (Control) |
|---|---|---|---|---|
| Level of Hydroxide, wt. %, BOR | 20 | 20 | 10 | none |
| Hot Tensile, psi | 70 | 71 | 123 | 148 |
| Cold Tensile, psi | 353 | 282 | 329 | 383 |
| Softening by water, seconds | 3 | 3 | ND | 5 |

The combination binder used in the above series of experiments was composed of a silicate with an $SiO_2$ to $Na_2O$ weight ratio of 2.58 and VITRAFOS polyphosphate with an average chain length of 21. In these sand tests, the binder level was 3.5 wt. % BOS or 1.575 wt. % solids BOS. The weight ratio of silicate to phosphate was 3:1.

Potassium silicate can replace sodium silicates in the binder systems of the invention. The potassium silicates can also be used in conjunction with sodium silicates as a first component of a binder system. Table 9 below illustrates such.

TABLE 9

Physical Properties of Cured Aggregate with Potassium Silicate As the Silicate Component

| | Silicate Only | | Silicate and Phosphate | |
|---|---|---|---|---|
| | Potassium Silicate | Sodium Silicate (control) | Potassium Silicate | Sodium Silicate (control) |
| Silicate Solids Level, wt. %, BOS | 1.575 | 1.575 | 1.181 | 1.181 |
| VITRAFOS Solids Level, wt. %, BOS | | | 0.394 | 0.394 |
| Total Binder Solids Level, %, BOS | 1.575 | 1.575 | 1.575 | 1.575 |
| Hot Tensile, psi | 142 | 112 | 105 | 148 |
| Cold Tensile, psi | 270 | 375 | 143 | 383 |
| Softening by water, seconds | >1200 | >1200 | 1 | 5 |
| Retained Strength, psi | 25 | 74 | 1 | 2 |

The potassium silicates used in the above experiments was KASIL #6, available from PQ Corp., Philadelphia, Pa. The silicate has an $SiO_2$ to $K_2O$ ratio of 2.1. Sodium silicate with a $SiO_2$ to $Na_2O$ weight ratio of 2.58 was used.

Softening of the Combination Binders at Elevated Temperatures

Specimens prepared with 100% sodium polyphosphate aqueous binder systems tend to soften when heated to temperatures near 250° C. If a core and/or mold softens at elevated temperatures experienced in metal pouring processes, serious casting defects will result. Comparative tests were conducted to determine if any softening occurs with the combination binder system of the invention at 500° C. Softening at 500° C. was measured in the following manner: a dog bone was supported on both ends and a 200 gram weight was hung at the midpoint. The apparatus was then placed in an oven at 500° C. The time at which the dog bone broke was recorded. Test results are shown in Table 10.

TABLE 10

Softening of cured aggregate with binder at 500° C.

| Binder Composition (wt %)-a, b, c, d | | | | | | | | | Binder Level %, BOS | Time to Break At 500° C. |
|---|---|---|---|---|---|---|---|---|---|---|
| SB41-a | BUDIT 4-b | BUDIT 7-b | BUDIT 8-b | BUDIT 9-b | Water | ALUSIL ET-c | 50% NaOH | PA 800K-d | | |
| 81.8 | | | | | 17.4 | | | 0.8 | 2.5 | >10 min. |
| 37.2 | 37.2-f | | | | 12.4 | | 12.4 | 0.8 | 4 | >10 min. |
| 37.2 | | 37.2-f | | | 12.4 | | 12.4 | 0.8 | 4 | >10 min. |

TABLE 10-continued

Softening of cured aggregate with binder at 500° C.

| Binder Composition (wt %)-a, b, c, d | | | | | | | | | Binder Level %, BOS | Time to Break At 500° C. |
|---|---|---|---|---|---|---|---|---|---|---|
| SB41-a | BUDIT 4-b | BUDIT 7-b | BUDIT 8-b | BUDIT 9-b | Water | ALUSIL ET-c | 50% NaOH | PA 800K-d | | |
| 37.2 | | | | 37.2-f | 12.4 | | 12.4 | 0.8 | 4 | >10 min. |
| 38.5-e | 38.5-f | | | | 12.8 | | 9.3 | 0.8 | 4 | >10 min. |
| | | | 19.0-g | 22.0-g | 50.1 | 8.2 | | 0.7 | 4 | 21 seconds | a. The sodium silicate used in this was SB 41, having a silica/soda ratio of 2.65.
b. BUDIT 4, 7, 8 and 9 are sodium polyphosphates with different chain lengths available from Cometals, Inc., New York, NY.
c. ALUSIL ET is sodium aluminum silicate and is used as a hot strength additive.
d. PA 800K is potassium-2-ethylhexyl phosphate and used as a flow agent, available from Lakeland Laboratories Ltd., Manchester, England.
e. Mixture of SB 41 with sucrose.
f. 45 wt. % solutions of polyphosphate employed.
g. Polyphosphate powder employed.

The all-phosphate system broke quickly (21 seconds) when the specimen was placed in the 500° C. oven. As a matter of fact, no softening of the combination binders was observed at temperatures up to 500° C. The all-sodium silicate binder also did not soften at temperatures up to 500° C.

Application of the Combination Binders

There are many ways in which combinations of sodium silicate and phosphate binders can be applied. A one part binder system is preferred. Supplying customers with products containing both the silicate and phosphate system will simplify handling and storage requirements for foundry operations. However, this requires pre-blending phosphates either as liquids or as solid-in-liquid or a blend of two solids.

Alternately, the use of two-component systems is possible. It is feasible to supply separate silicate and phosphate as liquid components. Furthermore, a multi-component binder system can be formulated with liquid sodium silicate, solid polyphosphate and water (or hydroxide) as individual ingredients. The individual components can be added to foundry sand simultaneously (or in sequence) to provide a curable sand mix. Selected component modes were evaluated and the data is shown in Table 11.

subjected to accelerated aging at 40° C. Then the aged binder is mixed with aggregate and used to prepare dog bones. The results are shown in Table 12.

TABLE 12

Aging Properties of Binders at 40° C.-a,b

| Days at 40° C. | Hot Tensile psi | Time to Break at 500° C.-c | Binder Appearance |
|---|---|---|---|
| 0 | 200 | >10 min. | OK |
| 7 | 229 | >10 min. | OK |
| 14 | 234 | >10 min. | OK |
| 21 | 243 | >10 min. | OK |
| 28 | 235 | >10 min. | OK |
| 35 | not tested | not tested | bottom third gelled | a. The combination binder contained 3 parts SB 41, one part 50% NaOH, one part water and three parts BUDIT 7 (45 wt. % solution). 4% binder was coated on CONGLETON 60 sand.
b. Curing was accomplished by blowing air at 140°–150° C. for 60 seconds with the core box at 120° C.
c. Time to break at 500° C. was measured as reported for Table 10.

The hot tensile and softening properties of cores produced with this combination binder did not change significantly for 28 days, suggesting that the one-part binder composition did not age appreciably at 40° C. until between 28 and 35 days.

TABLE 11

Comparison of Cured Aggregate Produced with Different Modes of Applications

| | 1 Component | 2 Components | | Multi-components |
|---|---|---|---|---|
| | | Silicate Solution Solid Phosphate | Silicate Solution Phosphate Solution | Silicate Solution, Solid Phosphate and Water |
| Sodium Silicate Solids Level, wt. %, BOS-a | 1.181 | 1.181 | 1.181 | 1.181 |
| VITRAFOS Solids Level, wt. %, BOS | 0.394 | 0.394 | 0.394 | 0.394 |
| Total Binder Solids Level, wt. %, BOS | 1.575 | 1.575 | 1.575 | 1.575 |
| Hot Tensile, psi | 136 | 102 | 148 | 121 |
| Cold Tensile, psi | 369 | 225 | 383 | 377 |
| Softening by water, seconds | 5 | 3 | 5 | 3 | a. The $SiO_2$ to $Na_2O$ weight ratio is 2.58

Data in Table 11 demonstrate that all these methods of applying the combination binder system can be used successfully.

Aging of Combination Binders

As previously stated, the one-part binder system is preferred for the ease of use. The one-part binder was prepared Use of Other Silicates High ratio sodium silicate (3.85 ratio) and lithium silicate were evaluated in the combination binder. These silicates are available from Crosfield Chemicals (Warrington, England). Several formulations were made and tested. The results are shown in Table 13.

TABLE 13

Physical Properties of Cured Aggregate Using Other Silicates

| Binder Composition, Weight % | | | | | Sand Test Results | | |
|---|---|---|---|---|---|---|---|
| 3.85 Ratio Sodium Silicate-a | BUDIT 7-d | NaOH (pellet) | Water | PA 800K | Hot Tensile, psi | Cold Tensile, psi | Softening at 500° C. |
| 55.09 | 16.11 | 9.28 | 19.52 | | 129 | 157 | >10 min. |
| 55.79 | 16.31 | 8.13 | 19.77 | | 126 | 158 | >10 min. |
| 54.14 | 15.83 | 10.85 | 19.18 | | 111 | 158 | >10 min. |
| Lithium Silicate-b | BUDIT 7-d | NaOH (pellet) | Water | PA 800K | Hot Tensile, psi | Cold Tensile, psi | Softening at 500° C. |
| 60.26 | 16.27 | 11.56 | 11.91 | | 122 | 176 | >10 min. |
| 61.77 | 16.68 | 9.35 | 12.21 | | 149 | 164 | >10 min. |
| 59.01 | 15.93 | 13.4 | 11.66 | | — | 145 | >10 min. |
| 2.65 Ratio Sodium Silicate-c | BUDIT 7-d | NaOH (pellet) | Water | PA 800K | Hot Tensile, psi | Cold Tensile, psi | Softening at 500° C. |
| 39.65 | 16.05 | 7.44 | 36.06 | 0.8 | — | 161 | >10 min. | a. This sodium silicate CRYSTAL 52, available from Crosfield Chemicals, Warrington, England
b. Lithium silicate CRYSTAL L40, available from Crosfield Chemicals, Warrington, England, $SiO_2/Li_2O = 8.8$
c. This sodium silicate SB 41, available from Crosfield Chemicals, Warrington, England.
d. Power.

a. This sodium silicate CRYSTAL 52, available from Crosfield Chemicals, Warrington, England
b. Lithium silicate CRYSTAL L40, available from Crosfield Chemicals, Warrington, England, $SiO_2/Li_2O=8.8$
c. This sodium silicate SB 41, available from Crosfield Chemicals, Warrington, England.
d. Powder.

Data in Table 13 indicate that the 3.85 ratio sodium silicate and lithium silicate can be used successfully as the silicate. No significant difference in performance was found.

Effect of Sand on Combination Binders

Some foundry binders are very sensitive to sand type and may fail miserably if an unacceptable sand is used. The following tests were conducted with a number of sands to determine the effect of sand type on tensile strength. Data are shown in Table 14.

TABLE 14

Effect of Aggregate on Cold Tensile Strength of Shapes With Binder[a]

| Sand Type | AFS GF No.[b] | Binder Level wt. %, BOS | Cold Tensile Strength, psi | |
|---|---|---|---|---|
| | | | Average | Range |
| CONGLETON (silica) | 59 | 4 | 214 | 185–238 |
| CONGLETON (silica) | 59 | 3 | 161 | 150–183 |
| Zicron | 116 | 3 | 306 | 255–335 |
| Zicron | 78 | 3 | 305 | 268–330 |
| Chromite | 53 | 3 | 300 | 263–315 |
| Olivine | 42 | 3 | 119 | 105–145 |

[a]Sand test procedure: binder was added to sand and mixed for 2 minutes with a KENWOOD CHEF mixer. Using a blowing machine, coated sand was blown in a dog bone core box at 120° C. and cured with purging warm (140–150° C.) air, at 50 psi pressure and a flow rate of 5 liters/second for 60 seconds. Tensile strengths were measured using a RIDSDALE Universal Sand Strength machine.
[b]American Foundryman's Society, grain fineness number.

a. Sand test procedure: binder was added to sand and mixed for 2 minutes with a KENWOOD CHEF mixer. Using a blowing machine, coated sand was blown in a dog bone core box at 120° C. and cured with purging warm (140–150° C.) air, at 50 psi pressure and a flow rate of 5 liters/second for 60 seconds. Tensile strengths were measured using a RIDSDALE Universal Sand Strength machine.

b. American Foundryman's Society, grain fineness number.

Data in Table 14 show that the combination binder of the invention can be used with a wide range of sands, including silica, zircon, chromite and olivine.

Heated Box Process

Similar to the experiments conducted for the heated box-air assisted process above, these tests were designed to determine, but not define the usability range of the combination binder. The general sand test procedure for the heated box process is as follows: The binders used in these experiments contained 45.0±0.5% solids, unless otherwise specified. 3000 gm WEDRON 530 silica sand was placed in a Hobart mixing bowl. Two depressions were made in the sand. Appropriate amounts of sodium silicate and sodium phosphate (see Table 15) (3.5% total binder level, based on sand weight) were placed into separate depressions. The mixer was started and mixing was continued for 2 minutes. Care was exercised to ensure even mixing of the binder components. Coated sand was then blown at 85 psi air pressure for 1 second into a 3-dog bone core box, which was equilibrated at 218° C., using a Redford Cartridge Bench Core Blower (Redford Iron and Equipment Company, Detroit, Mich.).

After 60 seconds, the core box was opened and the dog bones were removed. One dog bone was used for immediate (hot) tensile strength determination. The remaining 2 dog bones were used for dog bone weight and cold tensile testing. Cold tensile was measured after the dog bones were cooled for 30 minutes. Averages of at least 3 measurements were reported. Additional dog bones were prepared for humidity resistance testing, retained tensile strength and softening by water after exposure to metal pouring temperature (925° C.).

1. Hot Tensile Strength

Table 15 shows the variations of hot tensile strengths with respect to the composition of the combination binder.

TABLE 15

Hot Tensile Strength (in psi) of Cured Aggregate
With Binders (Heated Box Process)

| Silicate SiO2/Na2O Ratio | Phosphate Chain Length | Weight Ratio of Silicate to Phosphate | | | | | |
|---|---|---|---|---|---|---|---|
| | | 100:0 | 90:10 | 83.3:16.7 | 75:25 | 60:40 | 50:50 |
| 3.22-a | 21 | 54 | 65 | 55 | 46 | 21 | d |
| 2.58 | 32 | 44-c | 46 | 69 | 60 | 25 | d |
| 2.58 | 21 | 44-c | 63 | 87 | 71 | d | |
| 2.58 | 7 | 44-c | ND | 60 | 61 | 52 | d |
| 2.00 | 21 | 30 | 40 | 50 | 63 | d | |
| 1.60-b | 21 | d | 23 | 27 | 36 | 56 | d |
| 1.30-b | 21 | | | d | 41 | 59 | d |
| 1.00-b | 21 | | | | d | 56 | d |

Note: See Table 1 for footnotes of Tables 15–18.

In the experimental conditions, all-sodium silicate systems with the 3.22, 2.58 and 2.00 ratio sodium silicates were cured to have sufficient strengths for making dog bones. The addition of sodium phosphate resulted in higher hot tensile for the combination binder systems.

Cold tensile strengths in Table 16 show that the dog bones produced with $SiO_2/Na_2O$ ratios of 2.58 and 2.00 had the highest cold tensile overall. These results are consistent with those reported in Table 2. With other ratio silicates, cold tensile strengths are slightly lower. However, the molds produced with the combination binders at the other ratios are strong enough for common foundry practices.

It is important to note that for lower ratio sodium silicates, dog bones could not be made with sodium silicate alone. The addition of phosphate allowed for making dog bones and the strength data suggest that these binder systems are practical for foundry applications.

TABLE 16

Cold Tensile Strength (in psi) of Cured Aggregate
With Combination Binders (Heated Box Process)

| Silicate SiO2/Na2O Ratio | Phosphate Chain Length | Weight Ratio of Silicate to Phosphate | | | | | |
|---|---|---|---|---|---|---|---|
| | | 100:0 | 90:10 | 83.3:16.7 | 75:25 | 60:40 | 50:50 |
| 3.22-a | 21 | 423 | 394 | 136 | 136 | 60 | d |
| 2.58 | 32 | 407-c | 356 | 360 | 222 | 91 | d |
| 2.58 | 21 | 407-c | 397 | 464 | 374 | d | |
| 2.58 | 7 | 407-c | ND | 380 | 373 | 94 | d |
| 2.00 | 21 | 498 | 477 | 472 | 400 | d | |
| 1.60-b | 21 | d | 296 | 382 | 414 | 274 | d |
| 1.30-b | 21 | | | d | 330 | 360 | d |
| 1.00-b | 21 | | | | d | 117 | d |

Table 17 depicts the retained tensile strengths of the combination binder systems after exposure to 925° C. in a muffle furnace for 15 minutes.

TABLE 17

Retained Strength (in psi) of Cured Aggregate
after Heat Treatment (925° C.)
(Heated Box Process)

| Silicate SiO2/Na2O Ratio | Phosphate Chain Length | Weight Ratio of Silicate to Phosphate | | | | | |
|---|---|---|---|---|---|---|---|
| | | 100:0 | 90:10 | 83.3:16.7 | 75:25 | 60:40 | 50:50 |
| 3.22[a] | 21 | 10 | 3 | 4 | 1 | ND | d |
| 2.58 | 32 | 39[c] | ND | 6 | 0 | 0 | d |
| 2.58 | 21 | 39[c] | 4 | 8 | 1 | d | |
| 2.58 | 7 | 39[c] | ND | 4 | 0 | 0 | d |
| 2.00 | 21 | 144 | 9 | 12 | 4 | d | |
| 1.60[b] | 21 | d | 12 | 11 | 10 | 0 | d |
| 1.30[b] | 21 | | | d | 3 | 0 | d |
| 1.00[b] | 21 | | | | d | 0 | d |

Data in Table 17 strongly suggests that the binder systems of the invention had much more favorable mechanical shakeout properties than the all-silicate binders. This data is consistent with the data of Table 6.

Table 18 depicts the softening properties and thus, the reclamation properties of binder systems of the invention using water. The data is consistent with that reported in Table 7.

TABLE 18

Time to Soften Heat Treated Cured Aggregate
(in Seconds) by Water
(Heated Box Process)

| Silicate SiO2/Na2O Ratio | Phosphate Chain Length | Weight Ratio of Silicate to Phosphate | | | | | |
|---|---|---|---|---|---|---|---|
| | | 100:0 | 90:10 | 83.3:16.7 | 75:25 | 60:40 | 50:50 |
| 3.22[a] | 21 | >20 min. | 15 | 3 | 3 | ND | d |
| 2.58 | 32 | >20 min.[c] | ND | 4 | 3 | 2 | d |
| 2.58 | 21 | >20 min.[c] | 10 | 8 | 5 | d | |
| 2.58 | 7 | >20 min.[c] | ND | ND | 12 | 6 | d |
| 2.00 | 21 | >20 min. | 60 | 30 | 5 | d | |
| 1.60[b] | 21 | d | 40 | 15 | 10 | 3 | d |
| 1.30[b] | 21 | | | d | 20 | 3 | d |
| 1.00[b] | 21 | | | | d | 5 | d |

The results suggest that many of the combination binders retain their solubility and could be dissolved out by water much more easily than systems with sodium silicate binders alone. Dog bones produced with combination binders with high levels of silicate (>90%) were more resistant to water softening. As explained earlier, this is likely due to the formation of "glassy silicate" during exposure to high temperatures. More rapid softening of the combination binders suggests easier removal of spent binder on sand. These results will again translate into benefits in sand reclamation. Improved wet shakeout and sand reclamation are clearly other advantages of the combination binders. These results are consistent with the results reported in Table 7.

With a combination binder composition having 75 weight %, 2.58 ratio sodium silicate and 25 weight % VITRAFOS sodium phosphate (45 wt. % solution), the effect of various binder levels was investigated. Results are shown in Table 19.

TABLE 19

Effect of Binder Levels (Heated Box Process)

| | Binder Level, %, Based on Sand Weight | | |
|---|---|---|---|
| | 1.5 | 2.5 | 3.5 |
| Hot Tensile, psi | 26 | 54 | 71 |
| Cold Tensile, psi | 187 | 252 | 374 |
| Scratch Hardness | 25 | 47 | 66 |
| Dog Bone Weight, gm | 100.5 | 100.5 | 101.0 |
| Retained Strength, psi, 90% RH, 24 hrs. | 27 | 179 | 159 |
| Retained Strength, psi, 925° C. Treatment | 0 | 0 | 1 |
| Softening Time, seconds | 3 | 3 | 5 |

As expected, results show that higher binder levels increase tensile and scratch hardness properties. However, within the binder level range studied, the combination binders, after exposure to 925° C., were very low in retained tensile strengths and could be softened by water very rapidly.

Curing conditions were also examined. Again, with a combination binder composition having 75 weight % 2.58 ratio sodium silicate and 25 weight % VITRAFOS sodium phosphate (45 wt. % solution), different box temperatures and dwell times were evaluated for curing. Tensile strengths (hot and cold), scratch hardness, and retained strength after high humidity storage were monitored and the results are shown in Table 20.

TABLE 20

Effect of Curing Conditions (Heated Box Process)

Box Temperature, ° C.

| | 177 | | | |
|---|---|---|---|---|
| Dwell Time, seconds | 30 | 45 | 60 | 120 |
| Hot Tensile, psi | ND | 35 | 42 | 99 |
| Cold Tensile, psi | ND | 361 | 389 | 375 |
| Scratch Hardness | ND | 72 | 69 | 70 |
| Retained Strength, psi, 90% relative humidity (RH), 24 hrs. | ND | 14 | 39 | 323 |
| | 218 | | | |
| Dwell Time, seconds | 30 | 45 | 60 | 120 |
| Hot Tensile, psi | 25 | 46 | 81 | 175 |
| Cold Tensile, psi | 334 | 377 | 398 | 323 |
| Scratch Hardness | 69 | 64 | 68 | 68 |
| Retained Strength, psi, 90% RH, 24 hrs. | 10 | 147 | 144 | 273 |
| | 260 | | | |
| Dwell Time, seconds | 30 | 45 | 60 | 120 |
| Hot Tensile, psi | 42 | 62 | 94 | 160 |
| Cold Tensile, psi | 363 | 307 | 254 | 266 |
| Scratch Hardness | 68 | 62 | 58 | 59 |
| Retained Strength, psi, 90% RH, 24 hrs. | 37 | 151 | 233 | 241 |

Data in Table 20 show that hot tensile strength generally increased with higher box temperature and longer dwell time. For box temperatures at 177° and 218° C., longer dwell times did not have a major impact on cold tensile strength.

One very interesting observation is the retained strengths after exposure to high humidity. Curing at higher box temperature and longer dwell time made cured dog bones less susceptible to humidity.

As set forth in the procedure above, an air purge is not used in the heated box process. Because the combination binder system generates a large quantity of water vapor during the curing process, an air purge (to remove water vapor more effectively) was incorporated in this series of experiments during the curing cycle to determine the benefits, if any, on curing. Data are shown in Table 21.

TABLE 21

Effect of Air Purge in Cured Aggregate With Binders (Heated Box Process)[1,2]

| Dwell Time, seconds | 35 | 35 | 47 | 47 | 47 | 60 | 60 |
|---|---|---|---|---|---|---|---|
| Time before Air, seconds | | 20 | | 32 | 20 | | 32 |
| Air Purge Time, seconds | 0 | 6 | 0 | 6 | 18 | 0 | 18 |
| Hot Tensile, psi | 42 | 51 | 64 | 61 | 63 | 70 | 68 |
| Cold Tensile, psi | 414 | 463 | 299 | 358 | 379 | 318 | 347 |
| Scratch Hardness | 70 | 68 | 67 | 65 | 63 | 70 | 65 |

[1]The binder includes 75% by weight, 2.58 ratio sodium silicate and 25% weight of VITRAFOS (45 wt. % solution). The total binder level was 3.5%, based on sand weight. WEDRON 530 silica sand, obtained from Wedron Silica Co., Wedron, Illinois, was used.
[2]Ambient air was introduced into the core box at 30 psi.

With a short duration of ambient air purge, improvements in cold tensile strengths were observed. However, hot tensile and scratch hardness were little affected.

As an alternative to an air purge, a vacuum may be drawn across the shape to assist in dehydration of the shape.

Effect of incorporating borate ions into the combination binder was studied. Potassium tetraborate tetrahydrate was dissolved in water to obtain a 10 weight % solution. Solubility of potassium tetraborate in water is limited. This solution was added to sand as the binder components were added. The resulting sand mixture was evaluated. The results are shown in Table 22.

TABLE 22

Effect of Potassium Tetraborate on Cured Aggregate With Binder (Heated Box Process)

| 2.58 Ratio Sodium Silicate, Solids Level, wt. % BOS | 1.181 | 1.181 |
|---|---|---|
| VITRAFOS, Solids Level, wt. % BOS | 0.394 | 0.394 |
| Potassium Tetraborate Tetrahydrate, Solids Level, wt. %, Based on Solid Resin Weight[1] | 0 | 3.33 |
| Hot Tensile, psi | 65 | 80 |
| Cold Tensile, psi | 320 | 207 |
| Scratch Hardness | 63 | 61 |
| Dog Bone Weight, gm | 101.4 | 102.6 |
| Retained Strength, psi, 90% RH, 24 hrs. | 35 | 49 |
| Retained Strength, psi, 925° C. Treatment | 0 | 1 |
| Softening Time, seconds | 5 | 5 |

[1]Using potassium tetraborate tetrahydrate, a 10% by weight solution was prepared. This solution was added to the sand mixture as the binder components were added. Curing was accomplished by heating coated sand in a pattern at 218° C. for 60 seconds.

Data in Table 22 show that an addition of potassium tetraborate caused a drop in cold tensile strength. However and more significantly, the system containing potassium tetraborate was more resistant to humidity. It is also important to note that the mechanical shakeout properties (dry and wet) were not affected by the addition of tetraborate.

From all of the data above, it is apparent there has been provided, in accordance with the present invention, a binder and a method for improving the characteristics of an inorganic mold for foundry use as well as in the fields of shaping, casting and molding products, such as injection molding, casting of polymers, casting of concrete, etc. The molds of the present invention are superior when the surface of the mold has undercuts or another shape which prevents mold and article stripping. The improved collapsibility of the molds and cores of the present invention facilitates this use whenever article stripping is a problem.

While the invention has been described in conjunction with the specific embodiments thereof, and with reference to the tables presented herein, it is evident that many alternatives, modifications and variations will be apparent to those skilled in the art in light of the foregoing description. For instance, the methods of the invention require dehydration of shaped aggregate to cure the shape. The description of dehydration has included heating and warm air purges. Vacuum dehydration could also be used. However, it is to be understood that for purposes of this specification, air is considered an inert gas and could be replaced with any other inert gas, such as nitrogen, argon, etc. or mixtures of inert gases. The temperature of the air or other inert gas are such that dehydration is accomplished and suitable results have been achieved at a temperature of 90° C. and above. The inert gas may be employed solely to effect dehydration or may be used in combination with the heated box embodiment. Ambient air or other inert gas, rather than warm air or other inert gas, may be employed in some situations. So too can vacuum assist be used alone, or in combination, with the other embodiments to facilitate dehydration. Accordingly, it is intended that the present invention include all such alternatives, modifications and variations as set forth which are within the spirit and scope of the claims appended hereto.

What is claimed is:

1. A binder composition comprising:
    (a) an unreacted mixture of a water soluble silicate and a water soluble amorphous inorganic phosphate glass in an aqueous medium;
    (b) wherein the resulting mixture is a solution,
wherein the molar ratio of $SiO_2$ to $M_2O$ in the silicate is from about 0.6 to about 2.0, wherein M is selected from the group consisting of sodium, potassium, lithium and ammonium.

2. The binder composition of claim 1, wherein the phosphate glass comprises an alkali metal phosphate glass.

3. The binder of claim 1, further comprising a surfactant.

4. The binder of claim 1, further comprising a water-soluble anionic surfactant selected from the group consisting of organic sulphates, organic sulphonates, organic phosphate esters and mixtures thereof.

5. The binder composition of claim 1, wherein M is Na.

6. The binder composition of claim 1, wherein the molar ratio of $SiO_2$ to $M_2O$ in the silicate is from about 0.6 to 2.0.

7. The binder composition of claim 1, wherein the silicate comprises sodium silicate and the phosphate glass is at least one phosphate glass selected from the group consisting of sodium phosphate glass and potassium phosphate glass.

8. The binder composition of claim 7, wherein the phosphate glass has an ionic moiety of formula $((PO_3)_nO)$ wherein n is an average chain length and is between 3 and 32, inclusive.

9. The binder composition of claim 7, wherein the polyphosphate has an ionic moiety of formula $((PO_3)_nO)$ wherein n is an average chain length and ranges from 21 to 32.

10. A heat-curable binder composition comprising a water soluble silicate and a water soluble amorphous inorganic phosphate glass in an aqueous medium; wherein the water content of the composition being such that the composition is heat curable, wherein the molar ratio of $SiO_2$ to $M_2O$ in the silicate is from about 0.6 to about 2.0, wherein M is selected from the group consisting of sodium, potassium, lithium and ammonium.

11. The heat-curable binder composition of claim 10, wherein the water content is about 30% by weight to about 80% by weight of the binder composition.

12. The binder composition of claim 10, wherein the molar ratio of $SiO_2$ to $M_2O$ in the silicate is from about 0.6 to 2.0.

13. The binder composition of claim 10, wherein the silicate:phosphate ratio is about 39:1 to about 1:19 by weight based on solids.

14. The binder composition of claim 13, wherein the silicate:phosphate ratio is about 39:1 to 31:1 by weight based on solids.

15. The binder composition of claim 13, wherein the silicate:phosphate ratio is about 1:2 to 1:19 based on solids.

16. An uncured, unreacted binder composition for binding particulate material comprising a mixture of a water soluble inorganic silicate and a water soluble amorphous inorganic phosphate glass, wherein the mixture is not subjected to high temperatures prior to mixing said mixture with the particulate material, wherein the molar ratio of $SiO_2$ to $M_2O$ in the silicate is from about 0.6 to about 2.0, wherein M is selected from the group consisting of sodium, potassium, lithium and ammonium.

17. The binder composition of claim 16, wherein the molar ratio of $SiO_2$ to $M_2O$ in the silicate is from about 0.6 to 2.0.

18. A composition comprising a dry water soluble silicate component, a dry particulate component and a dry amorphous inorganic phosphate glass component.

19. A method of making a binder composition comprising:
    mixing a water soluble silicate and an amorphous inorganic phosphate glass in the presence of water; wherein the mixing is performed at ambient temperature in the absence of an aggregate, wherein the silicate has a molar ratio of $SiO_2$ to $M_2O$ from about 0.6 to about 2.0, wherein M is selected from the group consisting of sodium, potassium, lithium and ammonium.

20. The method of claim 19, wherein the molar ratio of $SiO_2$ to $M_2O$ in the silicate is from about 0.6 to 2.0.

* * * * *